United States Patent
Umezuki (10) Patent No.: US 8,230,188 B2
(45) Date of Patent: Jul. 24, 2012

(54) STORAGE MANAGEMENT APPARATUS, STORAGE SYSTEM, AND STORAGE MANAGEMENT METHOD

(75) Inventor: Takeshi Umezuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 367 days.

(21) Appl. No.: 12/695,281

(22) Filed: Jan. 28, 2010

(65) Prior Publication Data

US 2010/0235574 A1    Sep. 16, 2010

(30) Foreign Application Priority Data

Mar. 16, 2009    (JP) .................................. 2009-62201

(51) Int. Cl.
*G06F 12/02*    (2006.01)

(52) U.S. Cl. ........ 711/162; 711/161; 711/163; 711/165; 713/193

(58) Field of Classification Search .................. None
See application file for complete search history.

(56) References Cited

U.S. PATENT DOCUMENTS 7,721,058 B2 *   5/2010   Satoyama et al. ............ 711/162
7,757,100 B2 *   7/2010   Weissman et al. ............ 713/193

FOREIGN PATENT DOCUMENTS

| JP | 9-91186 | 4/1997 |
| JP | 2008-518295 | 5/2008 |
| WO | WO 2006/045767 A1 | 5/2006 |

* cited by examiner

*Primary Examiner* — Sanjiv Shah
*Assistant Examiner* — Daniel Tsui
(74) *Attorney, Agent, or Firm* — Staas & Halsey LLP (57) ABSTRACT

A storage management apparatus controls the storage device such that data is redundantly stored in each of an opened area and a closed area. The storage management apparatus includes an area laying-open unit and a re-redundancy unit. The area laying-open unit deletes or compresses data stored in the at least two closed areas, converts one of the closed areas into the opened area and writes data corresponding to a write request to the opened area and to at least the other of the closed areas, if a capacity of the storage device reaches a given value. The re-redundancy unit converts memory area of an add-on storage device into the closed area and copies data in an opened area, placed in a redundant-storing relationship with the data deleted or compressed by the area laying-open unit, to the closed area, if the storage device is added on.

12 Claims, 8 Drawing Sheets

| Archive ID | REDUNDANCY (STORED STATES) | COMPRESSION | Single Instance | LAST ACCESS | User Policy ID | Write System | Write User | Write Date |
|---|---|---|---|---|---|---|---|---|
| Archive 01 | 2 (STORED IN THE OTHER RAID) | WITHOUT | WITHOUT | 2007/10 | Policy-C | Server_A | User_A | 2004/10/11 |
| Archive 02 | 4 (STORED IN THE OTHER RAID) | WITHOUT | WITH | 2008/11 | Policy-A | Server_A | User_A | 2004/11/13 |
| Archive 03 | 2 (STORED IN THE OTHER RAID) | WITH | WITHOUT | — | Policy-D | Server_A | User_B | 2004/12/31 |
| Archive 04 | 2 (STORED IN THE OTHER RAID) | WITHOUT | WITHOUT | 2005/12 | Policy-C | Server_A | User_A | 2005/03/31 |
| Archive 08 | 3 (STORED IN THE OTHER RAID) | WITH | WITH | 2007/12 | Policy-B | Server_B | User_B | 2007/11/10 |

FIG. 6B

| User Policy ID | PRIORITY ORDER |
|---|---|
| Policy-A | 1 |
| Policy-B | 2 |
| Policy-C | 3 |
| Policy-D | 4 |

FIG. 6C

| User Policy ID | REDUNDANCY UPPER LIMIT VALUE |
|---|---|
| Policy-A | 4 |
| Policy-B | 3 |
| Policy-C | 2 |
| Policy-D | 2 |

FIG. 7A

STORAGE MANAGEMENT APPARATUS, STORAGE SYSTEM, AND STORAGE MANAGEMENT METHOD

CROSS-REFERENCE TO RELATED APPLICATIONS

This application is based upon and claims the benefit of priority of the prior Japanese Patent Application No. 2009-62201, filed on Mar. 16, 2009, the entire contents of which are incorporated herein by reference.

BACKGROUND

1. Field

Various embodiments described herein relate to a storage management apparatus, a storage system, and a storage management method, capable of managing data stored in storage.

2. Description of the Related Art

In recent years, storage, such as, a magnetic disk device, a tape device, Redundant Arrays of Inexpensive Disks (RAID), or the like, capable of storing a large amount of data, has been manufactured. Furthermore, storage systems, equipped with storage management apparatuses for operating the storage for long periods of time, have been produced.

In the storage management apparatuses of recent years, the storage is managed such that the storage is provided with an opened area and a closed area therein. The opened area is an area capable of being accessed by general users. On the other hand, the closed area is an area not capable of being accessed by the general users but capable of being accessed only by authorized users who possess given system management authority. Moreover, since the storage management apparatuses of recent years are capable of redundant-storing data in each of these areas, data loss due to improper operations by the users or due to system failures may be prevented.

In introducing a new storage system intended for long period of operation, data corruption may occur due to mistakes in handling data that result from an unfamiliar system or data may be deleted due to bugs in firmware within the storage system, at an initial stage of use of the new storage system. In addition, it is highly possible that users who are unfamiliar with handling the storage system itself lead to the data corruption and the data deletion due to improper operations.

Furthermore, if a bundle of data (hereinafter, referred to as "contents"), brought together in one archive file made up of a plurality of files for the purpose of providing a service, is redundantly stored in the opened area and the closed area, a memory area of the whole storage system becomes deficient with time from the start of its operation. A technique of addressing the above problem has been discussed. In this technique, a plurality of identical contents is not stored in the memory area but linked to one another, so that an amount of storage in use may be reduced (that is, managing with a "single-instance"). This technique allows a reduction in the amount of storage in use. However, on the other hand, this technique is unable to make effective use of an unused storage.

SUMMARY

According to an aspect of the invention, a storage management apparatus manages a storage device such that the storage device includes an opened area and a closed area and controls the storage device such that data is redundantly stored in each of the opened area and the closed area. The storage management apparatus includes an area laying-open unit and a re-redundancy unit. The area laying-open unit deletes or compresses data stored in the at least two closed areas, converts one of the closed areas, having stored the deleted data or the compressed data, into the opened area, writes data corresponding to a write request to the opened area, and writes the data corresponding to the write request to at least the other of the closed areas having stored the deleted data or the compressed data, if the write request of the data has been made while a capacity stored in the storage device reaches a given value. The re-redundancy unit converts a part of or whole memory area of an add-on storage device into the closed area and copies data in an opened area, placed in a redundant-storing relationship with the data deleted or compressed by the area laying-open unit, to the closed area, if the storage device is added on. The closed area is a memory area capable of being accessed only by a user with given authority and the opened area is a memory area capable of being accessed by both the user with given authority and other user without given authority.

The object and advantages of the various embodiments will be realized and attained by means of the elements and combinations particularly pointed out in the claims. It is to be understood that both the foregoing general description and the following detailed description are exemplary and explanatory and are not restrictive of the various embodiments, as claimed.

DETAILED DESCRIPTION OF THE EMBODIMENTS

Figure 1:
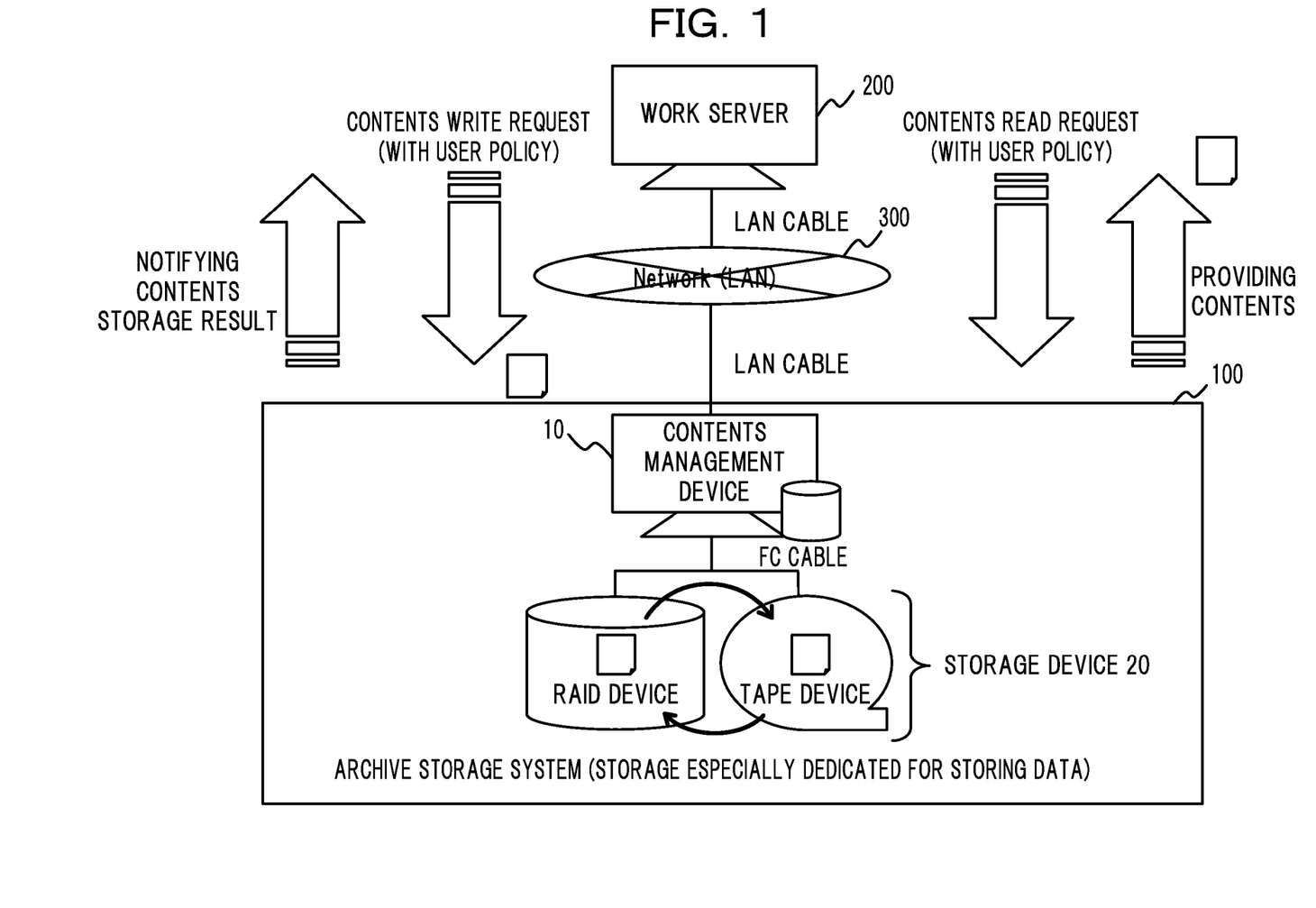
FIG. 1 illustrates a view indicating a whole system according to an embodiment.

Hereinafter, a system according to an embodiment will be disclosed with reference to FIG. 1. The system according to the embodiment includes a work server 200 and an archive storage system (hereinafter, may also be referred to as a "storage system") 100. The work server 200 is coupled to the archive storage system 100 with a local area network (LAN) serving as a network 300 between them.

The work server 200 issues a request to read contents (hereinafter, may also be referred to as a "read request") and a request to write contents (hereinafter, may also be referred to as a "write request") to the archive storage system 100. Note that an ID (that is, a user policy ID), by which a user policy is uniquely identified, is attached to the read request and the write request. The work server 200 serves as a client terminal apparatus that receives results of whether the contents may be stored or not and the contents from the archive storage system 100. The work server 200 may be a computer that is provided with a CPU, memories, and so on.

The archive storage system 100 provides the contents in response to the request from the work server 200. The archive storage system 100 serves as a storage system that stores the contents supplied to the work server 200. The archive storage system 100 includes a contents management device (storage management apparatus) 10 and a storage device 20 which stores the contents.

Figure 2:
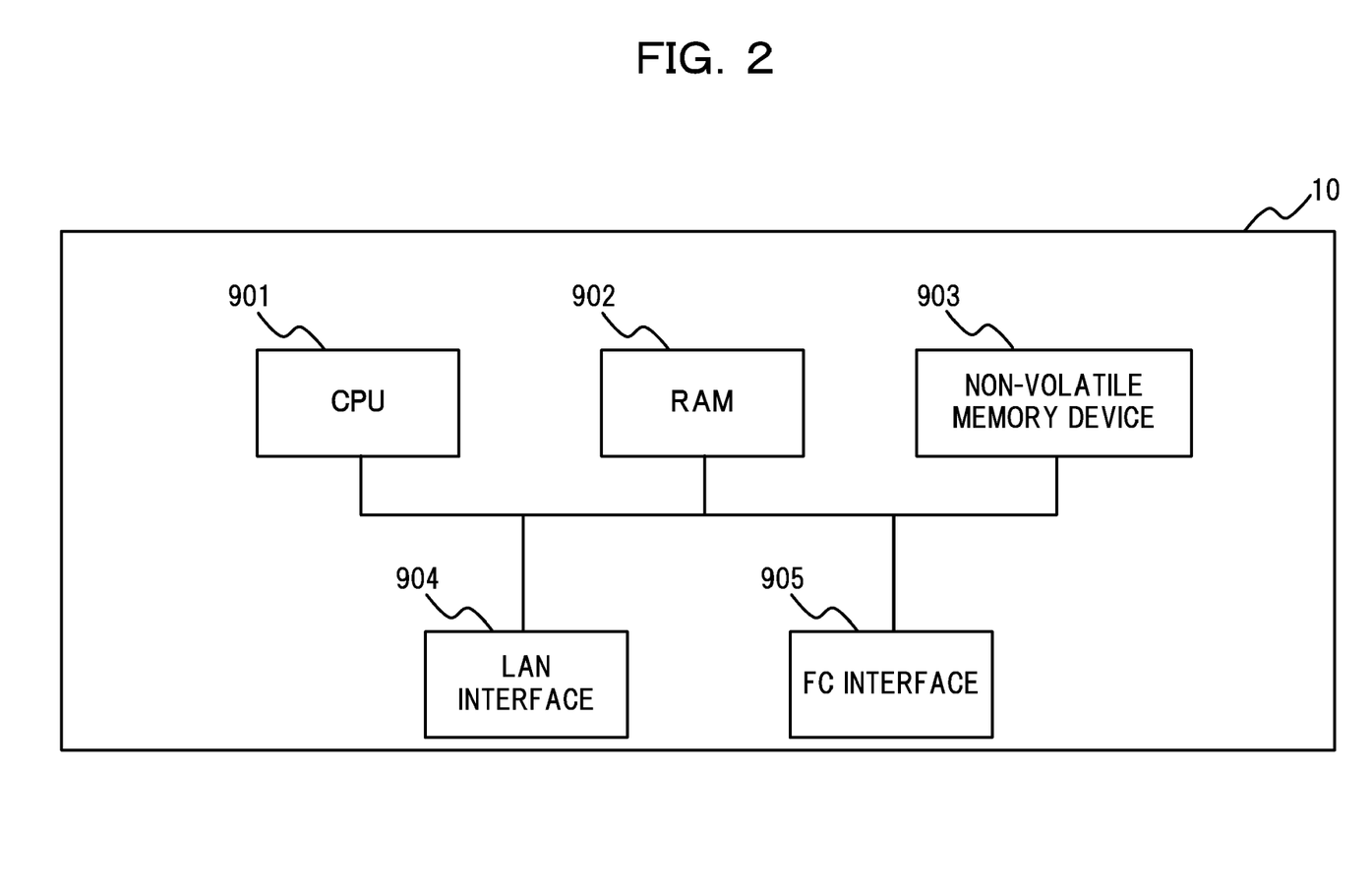
FIG. 2 illustrates a view explaining one example of hardware of a contents management device according to the embodiment.

The contents management device 10 executes an archiving process in which pieces of data are brought together in one (1) file and causes the storage device 20 to store these archived files (that is, the contents). The contents management device 10 manages a user policy and a contents location and controls automatic arrangement thereof. The contents management device 10 manages the storage device 20 such that the storage device 20 may be provided with an opened area and a closed area, and causes each of these areas to redundantly store the data. The opened area is an area capable of being accessed by general users. The closed area is an area unable to be accessed by the general users, but capable of being accessed only by an authorized user(s) who possess given system management authority. The storage device 20 may be, for example, Redundant Arrays of Independent Disks (RAID), a magnetic disc device, and a tape device. Note that, hereinafter, the storage device 20 may be a device configured as the RAID made up of a plurality of magnetic disc devices Next, hardware that forms the contents management device 10 will be disclosed with reference to FIG. 2. The contents management device 10 includes a central processing unit (CPU) 901 serving as an arithmetic unit executing programs, a random access memory (RAM) 902 serving as a main memory unit, and a non-volatile memory device 903 (such as, a build-in hard disc drive, a flash memory or the like) which stores the programs and a variety of data achieving the embodiment so as to prevent the data from being lost even after the power has been turned off. In addition, the contents management device 10 includes a LAN interface 904 and an FC interface 905. Inserting a LAN cable in the LAN interface 904 allows the contents management device 10 to establish communication with the work server 200 via a network 300. Inserting a fiber channel (FC) cable in the FC interface 905 allows the contents management device 10 to establish communication with the storage device 20.

Figure 3:
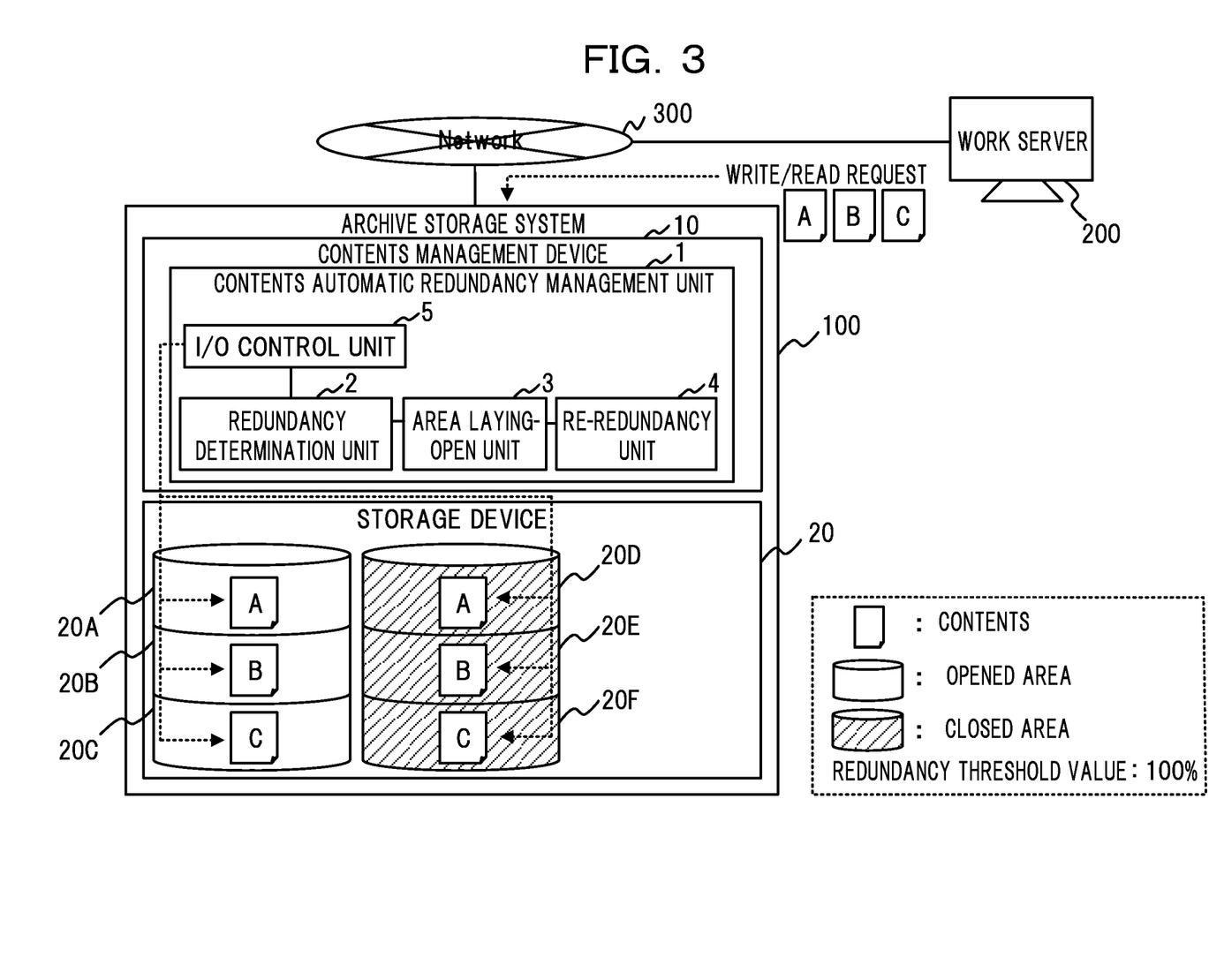
FIG. 3 illustrates a view explaining one example of functions of an archive storage system according to the embodiment.

Next, functional blocks of the contents management device 10 will be disclosed with reference to FIG. 3. The contents management device 10 includes a contents automatic redundancy management unit 1 that serves as a controller managing the contents such that the contents are automatically made redundant. The contents automatic redundancy management unit 1 includes a redundancy determination unit (priority order determination unit) 2, a unit for converting the closed area into the opened area (hereinafter, referred to as an "area laying-open unit") 3, a re-redundancy unit 4, and an I/O control unit 5. The program(s) stored in advance in the non-volatile memory device 903 is executed by the CPU 901 after the program has been loaded into the RAM 902, and hardware resources of the LAN interface 904 and the FC interface 905 are used. These operations allow the contents automatic redundancy management unit 1, the redundancy determination unit 2, the area laying-open unit 3, and the re-redundancy unit 4 to be achieved.

The redundancy determination unit 2 determines priority (priority order) of contents according to the user policies.

If a request to write the contents is issued from the work server 200 in a state where an available capacity of the storage device 20 is less than a given threshold value (hereinafter, may be referred to as a "capacity limit threshold value") stored in advance in the non-volatile memory device 903, the area laying-open unit 3 pre-fetches (deletes or compresses) contents stored in at least two (2) closed areas (that is, contents whose priority order is lower than that of the contents corresponding to the write request). Furthermore, the area laying-open unit 3 converts one of the closed areas, which stores the pre-fetched data, into an opened area and writes the contents, for which the write request has been made, to the opened area. Moreover, the area laying-open unit 3 writes the contents, for which the write request has been made, to a closed area that is at least one of the closed areas storing the pre-fetched contents and not having converted into the opened area.

If a storage device is added on, the re-redundancy unit 4 converts a part of the memory area or the whole memory area of the add-on storage device into the closed area. The re-redundancy unit 4 copies a contents, stored in the opened area and having a redundant storing relationship with the contents deleted or compressed by the area laying-open unit 3, to the closed area. Note that the re-redundancy unit 4 performs copy processing in descending order of priority among the contents determined by the redundancy determination unit 2. Furthermore, if there is a closed area in an existing storage device, the re-redundancy unit 4 copies contents stored in the closed area of the existing storage device, to the closed area of the add-on storage device, and the re-redundancy unit 4 converts the closed area of the existing storage device into an opened area.

If the request to write contents to the storage device 20 is issued from the work server 200, the I/O control unit 5 writes the contents to the both areas, that is, the opened area and the closed area. Furthermore, if the request to read contents from the storage device 20 is made, the I/O control unit 5 reads the contents stored in the closed area if there is contents corresponding to the read request in the closed area.

Figure 4:
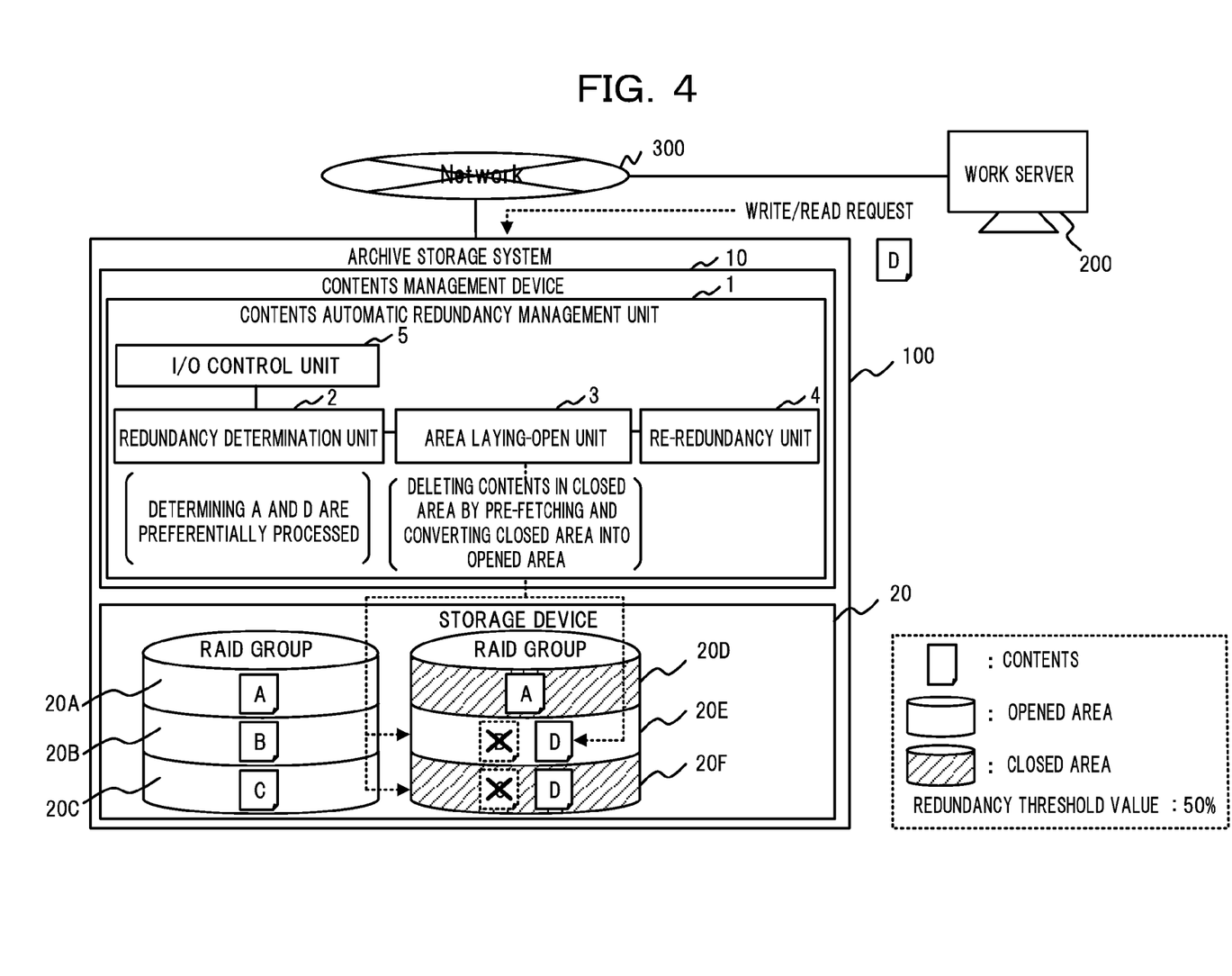
FIG. 4 illustrates a view explaining one example of prefetching contents of the archive storage system and converting a closed area into an opened area, according to the embodiment.
Figure 5:
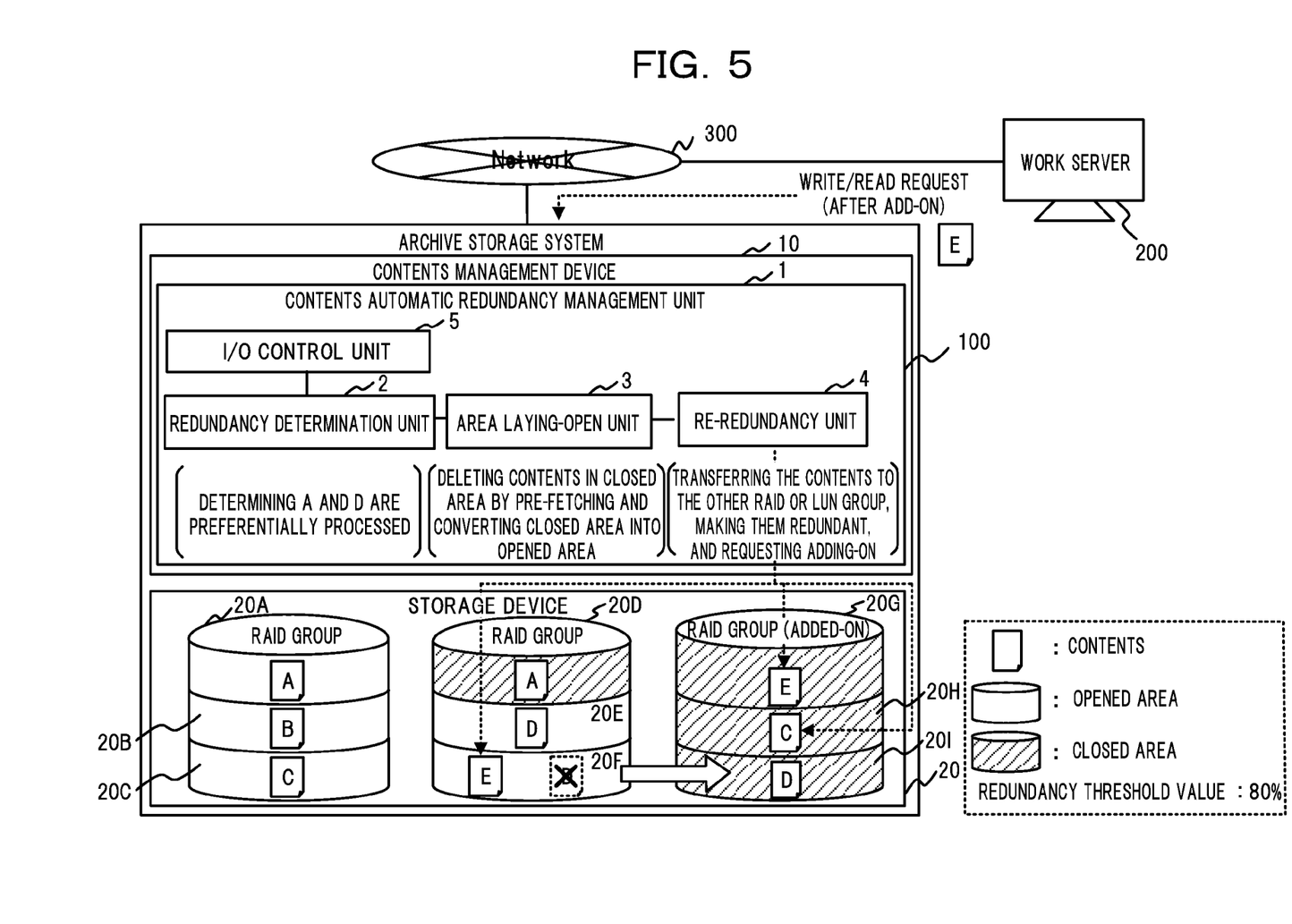
FIG. 5 illustrates a view explaining an example of operations in a case where a storage device is added on to the archive storage system, according to the embodiment.

Next, examples of operations of the respective units in the archive storage system 100 will be disclosed with reference to FIGS. 3 through 5. In the archive storage system 100, the non-volatile memory device 903 stores redundancy ratio and a redundancy threshold value (which is a threshold value of the redundancy). The redundancy ratio is a ratio obtained by dividing the number of redundant contents by the number of whole contents (the total number obtained by adding the number of redundant contents and the number of contents not made redundant) in the storage device 20. Note that the following explanations are made as an example of processing performed on the following five (5) contents, namely, contents A, contents B, contents C, contents D, and contents E. The priority is given to these contents in the following order, that is, the contents A, the contents E, the contents D, the contents C, and the contents B. Note that the contents A have a highest priority order and the contents B have a lowest priority order.

With reference to FIG. 3, the operation of the archive storage system 100 will be disclosed. A RAID group that includes magnetic disk devices 20A through 20C is specified as the opened area, on the other hand, a RAID group that includes magnetic disc devices 20D through 20F is specified as the closed area. Moreover, the redundancy threshold value is set to one hundred (100) percent in FIG. 3.

If requests to write the contents A, the contents B, and the contents C are issued from the work server 200 in a state where there is no contents stored in the storage device 20, the I/O control unit 5 writes the contents A, the contents B, and the contents C to the RAID group specified as the opened area and the RAID group specified as the closed area, respectively. Since all the contents are made redundant in this state, the redundancy ratio is one hundred (100) percent and falls within the range of the redundancy threshold value (here, one hundred (100) percent). Moreover, if the read request is issued from the work server 200, the I/O control unit 5 acquires contents from the RAID group specified as the closed area to provide the work server 200 with the contents. By doing so, high speed processing may be achieved.

As disclosed above, if the redundancy threshold value is one hundred (100) percent, the available capacity of the storage device 20 becomes lower than the capacity limit threshold value as the operation proceeds with time. In the above case, the re-redundancy unit 4 sends notification to the work server 200 to add on a storage device or to prompt a review of the redundancy threshold value. Hereinafter, an example where the redundancy threshold value is set by a user at, for example, fifty (50) percent will be disclosed with reference to FIG. 4. In addition, FIG. 4 illustrates a case where a request to write new contents D is issued from the work server 200.

The redundancy determination unit 2 determines the priority orders of the contents according to the user policy ID attached to the write request issued from the work server 200. As disclosed above, the priority orders of the contents A and the contents D are higher than those of the contents B and the contents C.

The area laying-opened unit 3 pre-fetches the contents B and the contents C, the priority orders of which are lower than that of the contents D, from the magnetic disc devices 20E and 20F specified as the closed areas. In addition, the area laying-opened unit 3 converts one of the magnetic disc devices, which has become a target of pre-fetching (in this embodiment, the magnetic disc device 20E), into the opened area and writes the contents D whose priority order is higher than those of the contents B and the contents C, to the magnetic disc devices 20E and 20F from which the contents have been pre-fetched. Since the two (2) contents (that is, the contents A and the contents D) out of the four (4) contents (that is, the contents A through D) are made redundant in the above state, the redundancy ratio is fifty (50) percent. Note that if the request to read the contents D is issued from the work server 200, the I/O control unit 5 acquires the contents D stored in the magnetic disc device 20F, which is specified as the closed area, to provide the work server 200 with the contents D.

Even in the state where the redundancy threshold value is set as low as fifty (50) percent, the number of contents increases as the operation further proceeds with time, and as a result thereof, an amount of data also increases. This causes the available capacity of the current storage device 20 to become lower than the capacity limit threshold value, and as a result thereof, it is difficult to perform the operation at or above the redundancy threshold value (fifty (50) percent) having been defined by the user. In the above case, notification to the work server 200 is made by the re-redundancy unit 4 to prompt an increase in capacity (that is, the add-on of the storage device) or the review of the redundancy threshold value.

Next, an example will be disclosed with reference to FIG. 5 in which a RAID device made up of three (3) magnetic disc devices 20G through 20I is added on by the user and a request to write the contents E is issued.

If the RAID device serving as the storage device is added on, the redundancy determination unit 2 determines the priority of the contents according to the user policy ID attached to the write request by the work server 200. In this embodiment, the redundancy determination unit 2 determines the priority in the following order, that is, the contents A, the contents E, the contents D, the contents C, and the contents B, as disclosed above. The re-redundancy unit 4 specifies a memory area of the add-on magnetic disc device as the closed area and copies the contents C whose priority order is higher than that of the contents B (note that the contents B and the contents C are currently not made redundant) to this closed area (the magnetic disc 20H in this embodiment), thereby making the contents C redundant. In FIG. 5, although all of the add-on magnetic disc devices are specified as the closed areas, it is also possible to specify only a part of the magnetic disc devices, for example, only the magnetic disc device 20G or the like, as the closed area.

Furthermore, the re-redundancy unit 4 checks the priority order of the contents E, for which the write request has been made by the work server 200, to see whether any contents whose priority order is lower than at least that of the contents E has been made redundant or not. In FIG. 5, since the contents D whose priority order is lower than that of the contents E has been made redundant, the re-redundancy unit 4 specifies the contents E as a target of the redundancy. Here, the pre-fetching by the area laying-open unit 3 disclosed with reference to FIG. 4 is performed and the contents E are written to the opened area and the closed area.

Furthermore, in the above case, the re-redundancy unit 4 may transfer the contents so that the opened area and the closed area are brought together with respect to each of the RAID groups. In FIG. 5, the re-redundancy unit 4 copies the contents D stored in the closed area of the magnetic disc device 20F to the add-on magnetic disc device 20I, converts a memory area of the magnetic disc device 20F from the closed area to the opened area, and writes the contents E to this opened area. In the above state, four (4) (that is, the contents A, the contents C, the contents D, and the contents E) out of the five (5) (that is, the contents A through E) are made redundant, and thus the redundancy ratio is eighty (80) percent.

Figure 6A:
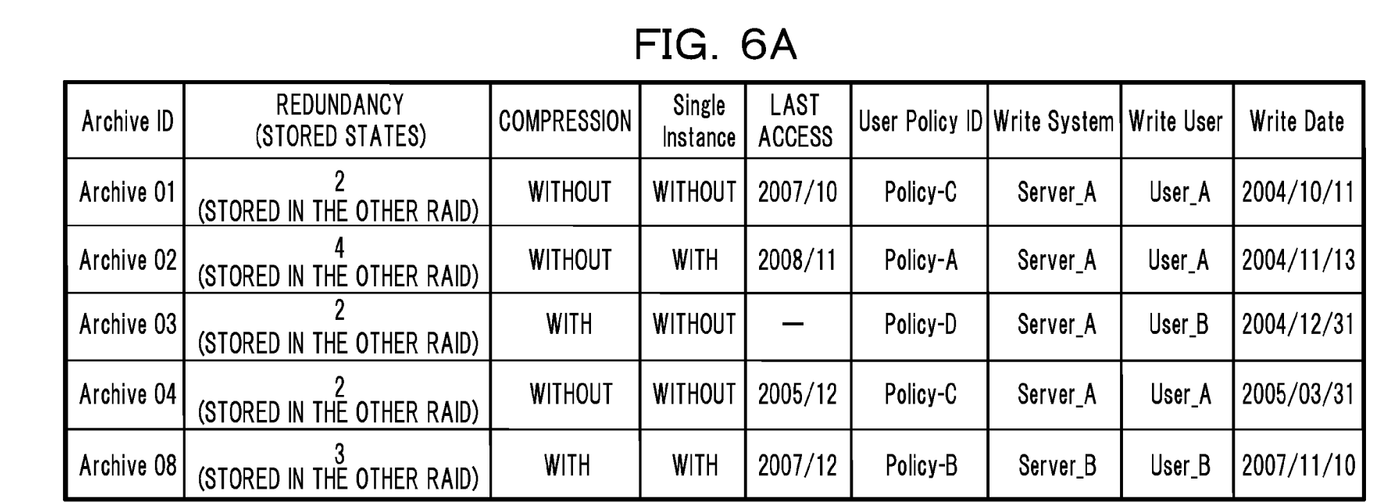
FIGS. 6A to 6C illustrate views each indicating one example of data used by the contents management device according to the embodiment.
Figure 6B:
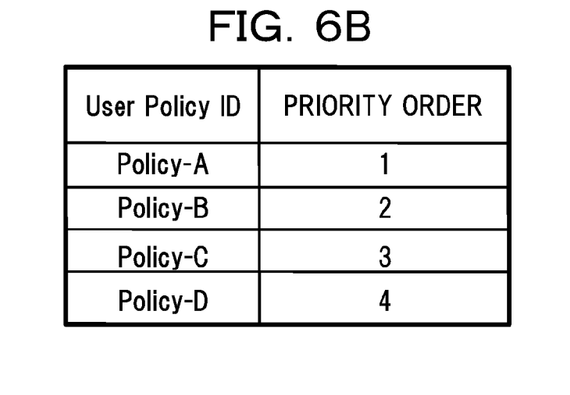
Figure 6C:
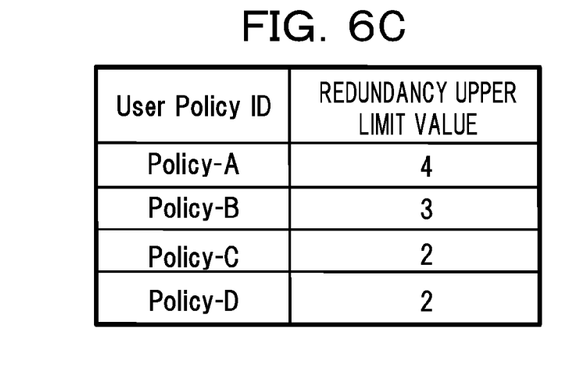

Next, the data used by the archive storage system 100 will be disclosed with reference to FIGS. 6A through 6C. The archive storage system 100 stores a data table, illustrated in FIGS. 6A through 6C, in the non-volatile memory device 903.

First, the data table (hereinafter, referred to as an "archive policy"), which manages information on the configuration of each contents, will be illustrated in FIG. 6A. The achieve policy includes pieces of data associated with "archive ID", "redundancy", and "stored state" therein. The "archive ID" serves as information uniquely identifying contents. The "redundancy" indicates how many contents are currently stored (that is, how many contents are made redundant) in the opened area and the closed area. The "stored state" indicates a current state of the stored contents. Furthermore, the archive policy includes pieces of data associated with "Compression" and "Single Instance." The "Compression" indicates whether contents are the ones currently being compressed or not. In FIG. 6A, "With" indicates a "compressed state" and "Without" indicates a "non-compressed state." The "Single Instance" indicates whether contents are managed as a single instance or not. In FIG. 6A, "With" indicates "managed as a single instance" and "Without" indicates "not managed as a single instance." In addition, the archive policy includes pieces of data associated with "LAST ACCESS" and "USER POLICY ID." The "LAST ACCESS" indicates the latest date of read access. The "USER POLICY ID" indicates an identifier of the user policy. Moreover, in a case where there is a plurality of work servers, the archive policy includes pieces of data associated with "Write System", "Write User", and "Write Data". The "Write System" serves as information by which a work server, having written contents, is identified. The "Write User" indicates a user account that is electrically connected to the archive storage system 100. The "Write Data" indicates the date on which contents have been written. Note that the user account in the "Write User" is a user account especially dedicated for establishing electrical connection with the archive storage system 100. That is, this user account is different from the one actually using the work server 200.

Next, information associated with the user policy will be disclosed with reference to FIG. 6B. In this embodiment, Policy-A defines a user policy indicating a user whose importance is high and who deals with contents frequently accessed. Policy-B defines a user policy indicating a user whose importance is high and who deals with contents not frequently accessed. Policy-C defines a user policy indicating a user whose importance is low and who deals with contents frequently accessed. Policy-D defines a user policy indicating a user whose importance is low and who deals with contents not frequently accessed. The information illustrated in FIG. 6B is a table in which a user policy ID and a priority order of contents are related with each other according to this user policy. In this embodiment, the lower the numbers, the higher the priority orders. A highest (1st) priority order is specified for the Policy-A, a second (2nd) highest priority order is specified for the Policy-B, a third (3rd) highest priority order is specified for the Policy-C, and a fourth highest (4th) priority order is specified for the Policy-D. Moreover, an upper limit value of the redundancy is stored in the non-volatile memory device 903 with respect to each user policy ID.

In addition to the example disclosed above, it is possible to determine the user policy in response to levels of skills possessed by the users who operate the archive storage system 100. For example, the redundancy upper limit value may be made greater by defining a user with less skillful as the user policy ID having a higher priority order, and as a result thereof, data loss may be prevented.

Furthermore, beside these pieces of data disclosed above, a correspondence relationship between the "Archive ID" and "Device ID" serving as information identifying the discrete magnetic disc device is stored in the non-volatile memory device 903. Moreover, a correspondence relationship between the "Device ID" and "difference between opened area and closed area" is stored in the non-volatile memory device 903. Note here that the "difference between opened area and closed area" indicates whether a magnetic disc device with a certain device ID is managed as the opened area or the closed area.

Figure 7A:
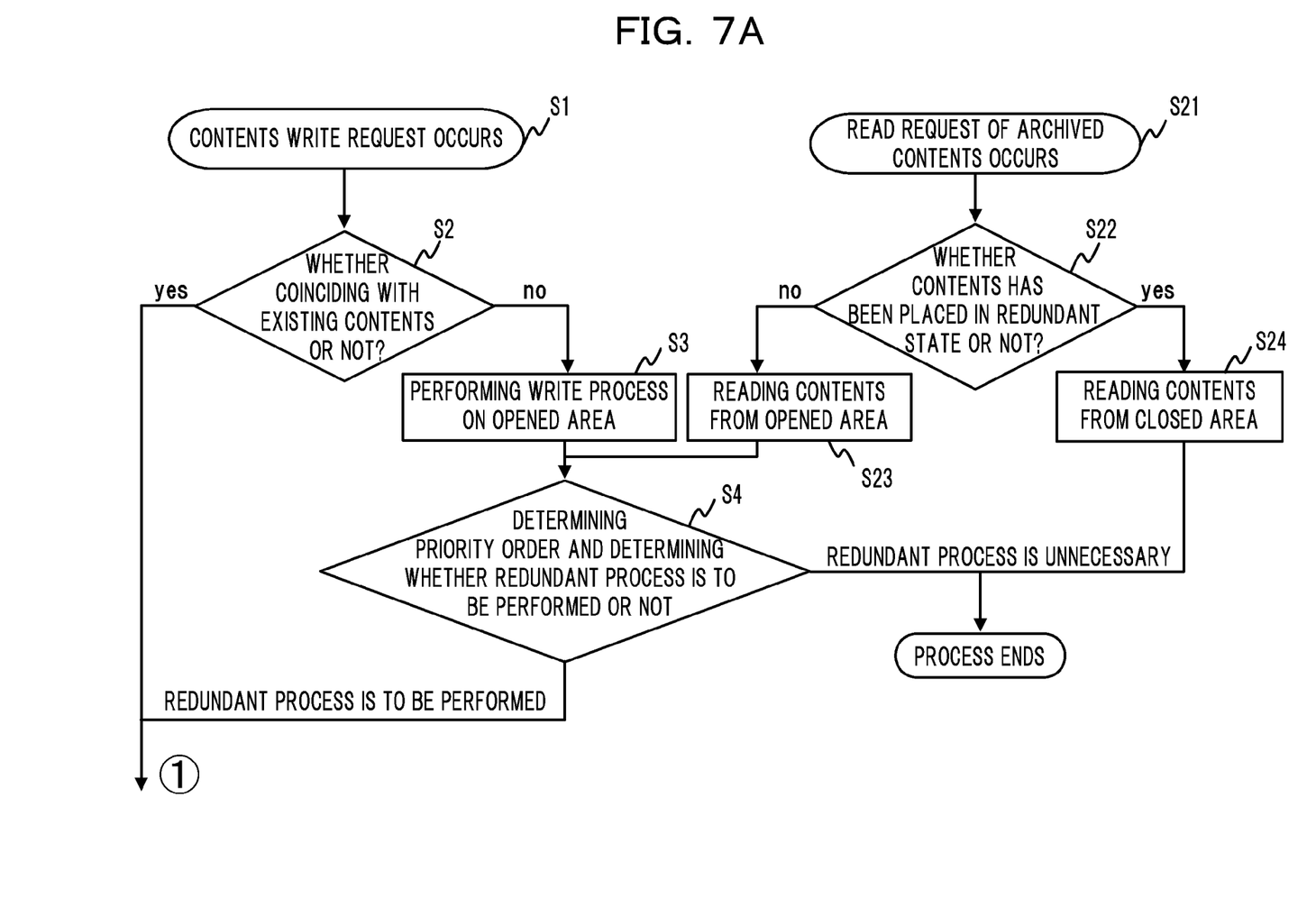
FIGS. 7A-7B illustrate a flowchart indicating one example of operations of the contents management device according to the embodiment.
Figure 7B:
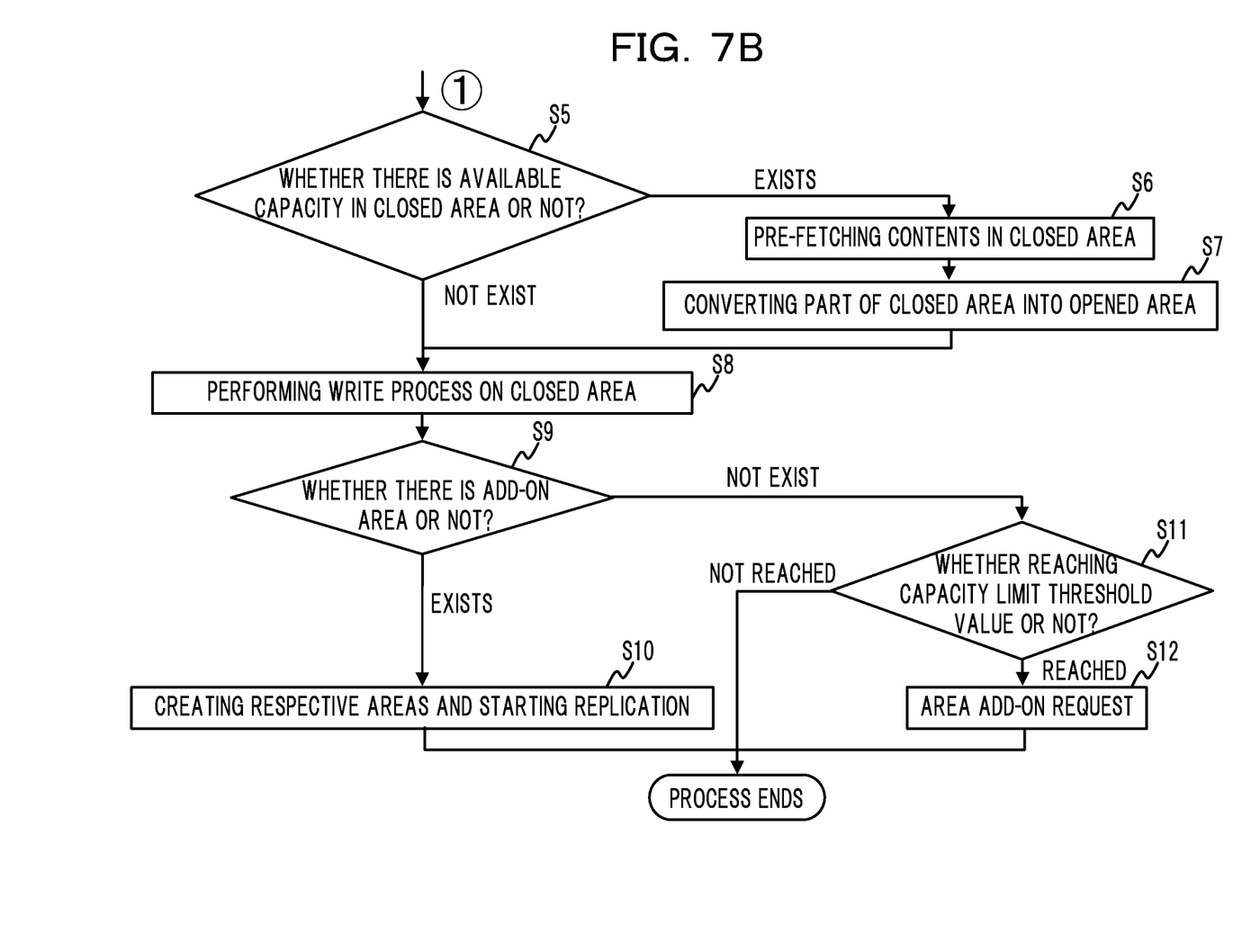

Next, processing by the archive storage system 100 will be disclosed with reference to a flowchart illustrated in FIG. 7.

First, a process in a case where a request to write contents is made by the work server 200 will be disclosed. Note that, in this embodiment, a value of the "User Policy ID" (for example, the "Policy-A" or the like) is also sent from the work server 200 upon the write request is issued.

In response to the request to write the contents which is issued from the work server 200 (Operation S1), the I/O control unit 5 enters an archive policy of the contents in the data table illustrated in FIG. 6A and determines whether the contents that are to be written has already been stored in the storage device 20 or not (Operation S2). Here, the I/O control unit 5 calculates a hash value of the contents for which the write request has been made, and makes a determination by comparing the calculated hash value with a hash value of the contents having already been stored in the storage device 20.

If the contents is not stored (Operation S2 no), the I/O control unit 5 performs a write process on the opened area (Operation S3).

The redundancy determination unit 2 determines the priority order of the contents, corresponding to the write request, according to a user policy, having been acquired from the work server 200 concurrently with the write request, and determines whether a redundancy process is to be performed or not (Operation S4). The redundancy determination unit 2 searches the data table in FIG. 6C with the use of the user policy ID acquired from the work server 200 to obtain the redundancy upper limit value and determines whether the redundancy process is to be performed or not by determining current redundancy (the "redundancy" in FIG. 6A) has already reached the redundancy upper limit value or not.

If the redundancy determination unit 2 determines that the redundancy process is unnecessary (Operation S4, redundancy process is unnecessary), the processing terminates. On the other hand, if the redundancy determination unit 2 determines that the redundancy process is to be performed (Operation S4, the redundancy process is to be performed), the area laying-open unit 3 checks an available capacity of the storage device 20 to determine whether the available capacity is lower than a given capacity limit threshold value or not. If the available capacity is lower than the given capacity limit threshold value (Operation S5 NOT EXIST), the area laying-open unit 3 pre-fetches contents in the closed area (Operation S6). The pre-fetching is performed based on the priority orders determined by the redundancy determination unit 2. That is, the pre-fetching is performed in the order of the archive IDs that correspond to the user policy IDs attached to the contents whose priority orders are low. Note that the pre-fetching may also be performed according to periods. That is to say, among the contents having been made redundant, the contents may be pre-fetched in chronological order of the contents from the oldest (the contents whose "Write Data" in FIG. 6A are older) or in order on the basis of an access frequency to the contents (the contents to which an access is not made in a given period of time with reference to the "LAST ACCESS" in FIG. 6) or the like. In addition, it is also possible that, the redundant states of such contents that managed as the single instance are preferentially kept by the area laying-open unit 3 so as to maintain their read performances.

The area laying-open unit 3 converts a part of the closed area into the opened area (Operation S7). Note that the area laying-open unit 3 switches between the opened area and the closed area by changing a setting value of the "difference between opened area and closed area" disclosed above. Thereafter, the processing goes to Operation S8.

On the other hand, if the available capacity is not lower than the capacity limit threshold value (Operation S5, that is, EXISTS) the area laying-open unit 3 writes the contents to the closed area, without change (Operation S8). Note that the I/O control unit 1 may execute the process in Operation S8. Thus, the archive storage system 100 is capable of improving reliability of the contents and access performance by configuring the opened area and the closed area as different RAIDs and different LUNs.

The re-redundancy unit 4 determines whether there is an add-on area or not (Operation S9). If there is no add-on area (operation S9 NOT EXIST), the re-redundancy unit 4 determines whether the available capacity is lower than the capacity limit threshold value or not (Operation S11). If the available capacity is lower than the capacity limit threshold value (Operation S11, REACHED), notification to the work server 200 to add on the storage device 20 or to prompt a review of the redundancy threshold value is made by the re-redundancy unit 4, and the process terminates. On the other hand, if the available capacity does not reach the capacity limit threshold value (Operation S11, NOT REACHED), the process terminates without change.

On the other hand, if the re-redundancy unit 4 determines that there is an add-on area (Operation S9, EXISTS), the re-redundancy unit 4 creates an opened area and a closed area on the add-on area, whereby a replication process is started (Operation S10).

Next, processing in a case where a request to read contents is issued from the work server 200 will be disclosed. In response to the request to read the contents issued from the work server 200 (Operation S21), the I/O control unit 5 determines whether the contents are in the redundant state or not (Operation S22) by referencing redundancy in the archive policy (see FIG. 6A). If the contents has already been made redundant (Operation S22 yes), the I/O control unit 5 reads the contents out from the closed area to provide the work server 200 with the contents (Operation 24), thereafter the process terminates. Thus, in response to the occurrence of a read access to the contents, a read process is preferentially performed on the closed area on which the contents having been made redundant. This allows the archive storage system 100 to achieve faster access to the contents (that is, a quick response to the read request) by virtue of distribution of access load. In addition, if the contents has not been made redundant (Operation S22, no) the I/O control unit 5 reads the contents out from the opened area (Operation S23), and the processing goes to Operation S4.

Thus, in storing the contents, all the stored contents, including the ones managed as the single instance, are redundantly stored in an unused area (RAID and LUN). This allows the contents to be stored without fail even if a problem resulted from the firmware or an operation failure has occurred. In addition, with regard to an achievable area, since an area except non-redundant areas is capable of being provided as unused areas, a protection level of contents is capable of being user-transparently improved (i.e., without the user's awareness of the above operation mechanism).

In addition, the storage device 20 of the archive storage system 100 preferentially performs the write process, and the storage device 20 preferentially accesses the closed area in the magnetic disc device and reads the contents having been made redundant in the closed area, in response to the occurrence of the access to the contents. This allows the archive storage system 100 to achieve quick access to the contents (that is, a quick response to the read request), and thus, the distribution of access load and a reduction in failure rate of the discs may be achieved.

In consequence, it is possible to make effectively use of the memory capacity of the storage device by compressing or deleting the data in the closed area (in the case where the available capacity of the storage device decreases) and by copying the compressed or deleted data to the closed area of the add-on storage device (in the case where the storage device is added on).

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage management apparatus that manages a storage device such that the storage device includes an opened area and a closed area, and that controls the storage device such that data is redundantly stored in each of the opened area and the closed area, the storage management apparatus comprising:

an area laying-open unit that deletes or compresses data stored in at least two closed areas, converts one of the closed areas having stored the deleted data or the compressed data into the opened area, writes data corresponding to a write request to the converted opened area, and writes the data corresponding to the write request to at least one of the other closed areas having stored the deleted data or the compressed data, when the write request of the data has been made while a capacity stored in the storage device reaches a given value; and a re-redundancy unit that converts a part of or whole memory area of an add-on storage device into the closed area and copies data in an opened area placed in a redundant-storing relationship with the data deleted or compressed by the area laying-open unit, to the closed area, when the storage device is added on, wherein the closed area is a memory area capable of being accessed only by a user with given authority and the opened area is a memory area capable of being accessed by both the user with given authority and one or more other users without given authority.

2. The storage management apparatus according to claim 1, further comprising:

an I/O control unit that reads the data stored in the closed area if a read request to read the data from the storage device is made and the data is in the closed area.

3. The storage management apparatus according to claim 1, further comprising:

a priority order determination unit that determines a priority order of the data, wherein the area laying-open unit further deletes or compresses data whose priority order is lower than a priority order of the data corresponding to the write request, and the re-redundancy unit copies the data in the opened area in descending order of data priority.

4. The storage management apparatus according to claim 1, wherein when there is further a closed area in an existing storage device, the re-redundancy unit copies data stored in the closed area in the existing storage device, to the closed area in the add-on storage device and converts the closed area in the existing storage device into the opened area.

5. A storage system that includes a storage device and a storage management apparatus controlling the storage device, the storage management apparatus comprising:
an area laying-open unit which deletes or compresses data stored in at least two closed areas, converts one of the closed areas having stored the deleted data or the compressed data into an opened area, writes data corresponding to a write request to the opened area, and writes the data corresponding to the write request to at least one of the other closed areas having stored the deleted data or the compressed data, when the write request of the data has been made while a capacity stored in the storage device reaches a given value; and
a re-redundancy unit that converts a part of or whole memory area of an add-on storage device into the closed area and copies data in an opened area placed in a redundant-storing relationship with the data deleted or compressed by the area laying-open unit, to the closed area, when the storage device is added on, wherein
the storage management apparatus manages the storage device such that the storage device includes a plurality of closed areas that serve as a memory area capable of being accessed only by a user with given authority and a plurality of opened areas that serve as a memory area capable of being accessed by both the user with given authority and one or more other users without given authority and controls the storage device such that the data is redundantly stored in each of the opened area and the closed area.

6. The storage system according to claim 5, the storage management apparatus further comprising:
an I/O control unit that reads the data stored in the closed area if a read request to read the data from the storage device is made and the data is in the closed area.

7. The storage system according to claim 5, the storage management apparatus further comprising:
a priority order determination unit that determines a priority order of the data, wherein
the area laying-open unit further deletes or compresses data whose priority order is lower than a priority order of the data corresponding to the write request, and
the re-redundancy unit copies the data in the opened area in descending order of data priority.

8. The storage system according to claim 5, wherein
when there is further a closed area in an existing storage device, the re-redundancy unit copies data stored in the closed area in the existing storage device to the closed area in the add-on storage device and converts the closed area in the existing storage device into the opened area.

9. A storage management method for managing a storage device such that the storage device includes an opened area and a closed area and which controls the storage device such that data is redundantly stored in each of the opened area and the closed area, the method comprising:
deleting or compressing data stored in at least two closed areas, converting one of the closed areas having stored the deleted data or the compressed data into the opened area, writing data corresponding to a write request to the opened area, and writing the data corresponding to the write request to at least one of the other closed areas having stored the deleted data or the compressed data, when the write request of the data has been made while a capacity stored in the storage device reaches a given value; and
converting a part of or whole memory area of an add-on storage device into the closed area and copying data in an opened area, placed in a redundant-storing relationship with the data deleted or compressed by the area laying-open unit, to the closed area, when the storage device is added on, wherein
the closed area is a memory area capable of being accessed only by a user with given authority and the opened area is a memory area capable of being accessed by both the user with given authority and one or more other users without given authority.

10. The method according to claim 9, further comprising:
reading the data stored in the closed area when a read request to read the data from the storage device is made and the data is in the closed area.

11. The method according to claim 9, further comprising:
determining a priority order of the data;
deleting or compressing data whose priority order is lower than a priority order of the data corresponding to the write request; and
copying the data in the opened area in descending order of data priority.

12. The method according to claim 9, wherein
when there is further a closed area in an existing storage device, copying data stored in the closed area in the existing storage device to the closed area in the add-on storage device and converting the closed area in the existing storage device into the opened area.

* * * * *